Sept. 16, 1924.

E. H. REMDE

SEAT FOR VEHICLES

Filed Feb. 4, 1922

INVENTOR:
Edward H. Remde
BY Edward R. Alexander
ATTORNEY.

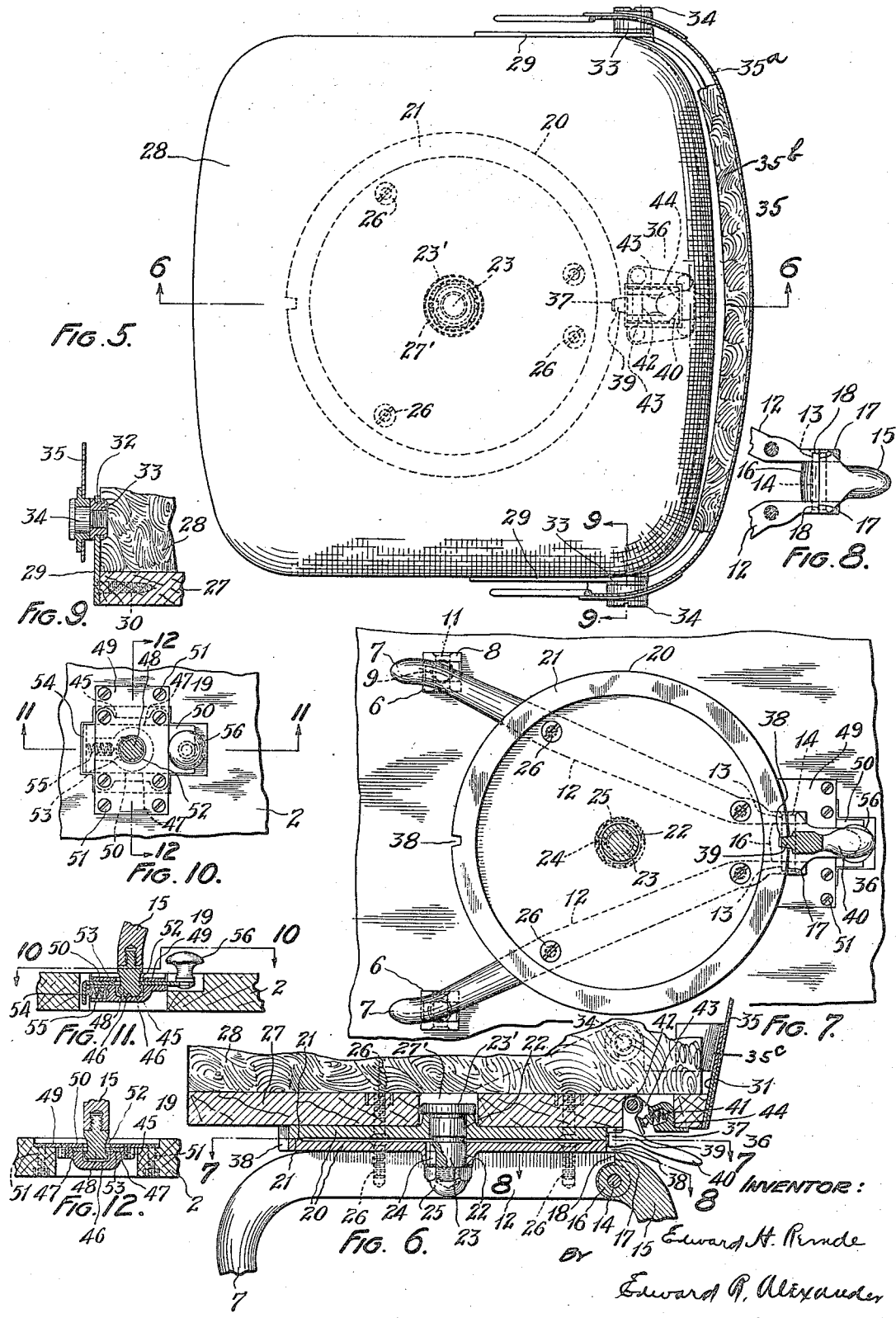

Patented Sept. 16, 1924.

1,508,576

UNITED STATES PATENT OFFICE.

EDWARD H. REMDE, OF CLEVELAND, OHIO, ASSIGNOR TO THE BAKER R & L COMPANY, OF CLEVELAND, OHIO, A CORPORATION OF OHIO.

SEAT FOR VEHICLES.

Application filed February 4, 1922. Serial No. 534,267.

*To all whom it may concern:*

Be it known that I, EDWARD H. REMDE, citizen of the United States, residing at Cleveland, in the county of Cuyahoga and State of Ohio, have invented certain new and useful Improvements in and Relating to Seats for Vehicles, of which the following is a specification.

This invention relates to a seat for vehicles.

One object of the invention is to provide a seat which may be collapsed or folded and positioned adjacent the body or body wall of a vehicle to provide maximum unobstructed space therewithin when the seat is not in use.

Another object of the invention is to provide a foldable seat of relatively simple construction, whereby the same may be readily and economically manufactured and easily operated.

Other objects of the invention will be apparent to those skilled in the art to which the invention relates from the following description taken in connection with the accompanying drawings, in which—

Figure 1:
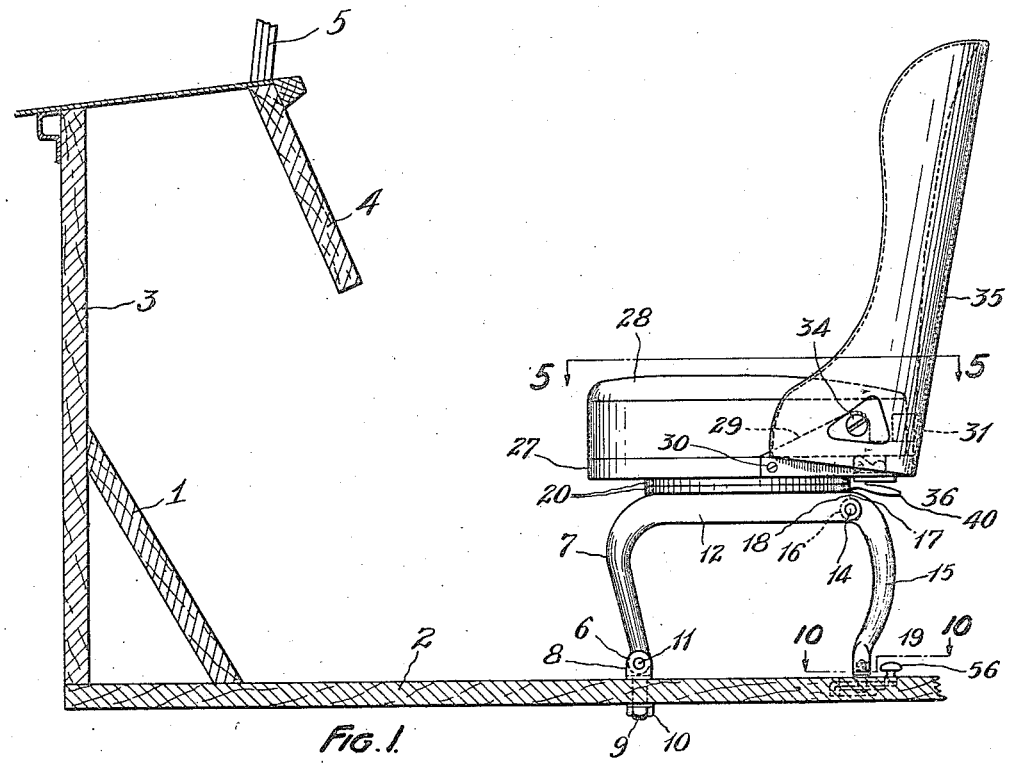
Fig. 1 is a view showing a portion of a vehicle body in section and a seat for the vehicle, in elevation, embodying my invention.
Figure 2:
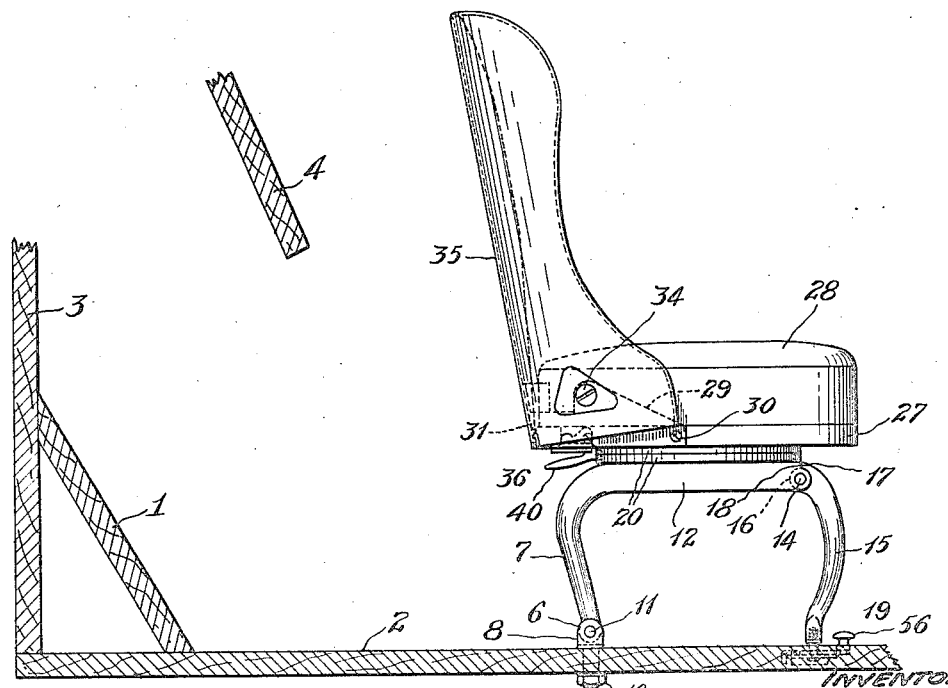
Fig. 2 is a view similar to Fig. 1, but showing the seat reversed so that the passenger may face toward the rear of the vehicle.

Fig. 5 is a section on the line 5—5 of Fig. 1.
Fig. 6 is a section on the line 6—6 of Fig. 5.
Fig. 7 is a section on the line 7—7 of Fig. 6.
Fig. 8 is a section on the line 8—8 of Fig. 6.
Fig. 9 is a section on the line 9—9 of Fig. 5.
Fig. 10 is a section on the line 10—10 of Fig. 1; being also a plan view of the parts shown in Fig. 11.

Fig. 11 is a section on the line 11—11 of Fig. 10.

Fig. 12 is a section on the line 12—12 of Fig. 10.

In the drawings, 1 indicates a vehicle body of any desired form and construction. In practice, the seat embodying my invention may be adapted for use in connection with any type of car, but by experience its most useful application has been found in connection with sedan bodies and bodies of the enclosed type such as used for electrically driven vehicles, wherein it is desirable to sit facing toward the front or rear of the vehicle, at will. The vehicle body 1 comprises or includes a floor 2, a front wall 3, and, by preference, a dash or instrument board 4, either or both being disposed below the wind-shield 5.

6 indicates sets of knuckles fixed in any suitable manner to the floor 2 and spaced to serve as pivotal supports for the lower ends of a pair of legs 7. The knuckles 6 of each set are formed integrally with a support 8, which in turn is provided with a depending bolt 9. The bolt 9 extends through an opening formed in the floor 2 and carries a nut 10, which serves to rigidly connect the support 8 to the floor 2. The lower or free ends of the legs 7 are fashioned to fit between the knuckles and also formed with an opening to receive a pivot pin 11 (supported by the knuckles), on which the legs may swing.

By preference, the upper ends of the legs 7 are extended and bent at substantially right angles to their upright portions as shown at 12. The extensions 12 preferably converge toward their free ends (see Fig. 7). 13 indicates openings formed in the free ends of the extensions 12 and arranged to support the opposite ends of a shaft 14. 15 indicates a separate leg having a knuckle 16 through which extends the shaft 14 to pivotally connect the separate leg 15 to the extensions 12. By converging the extensions 12, it will be seen that their free ends may be spaced to receive between them the knuckle 16 and operate to prevent movement of the latter endwise of the shaft 14.

The upper end of the leg 15 is provided with one or more projections 17 which engage with abutments 18 (Fig. 4) provided on the extensions 12 to limit the swinging movement of the leg 15 outwardly when the seat is to be unfolded, so that the legs 7 and 15 will have a predetermined relationship and the leg 15 positioned for engagement with a detachable connection, indicated as an entirety at 19, to which reference will later be made.

20 indicates a turn table, preferably comprising a pair of circular disks or plates having annular runs or bearing surfaces 21 and bearings 22 for a shaft 23 about which the upper disk turns on the lower disk. The shaft 23 is preferably provided with a head 23' which rests upon the end wall of the adjacent bearing 22. The shaft is preferably keyed, as shown at 24, to the bearing 22 of the lower disk and held against displacement by a nut 25, engaging screw threads on the lower reduced end of the shaft 23. The disks 20 are respectively fixed, preferably by countersunk screws 26, to extensions 12 and a seat base 27, which may support a cushion or upholstered portion 28, thereby forming the seat proper. The base 27 is preferably formed with a cut-away portion 27' to receive the projecting wall of the adjacent bearing 22 and shaft head 23'.

Figure 4:
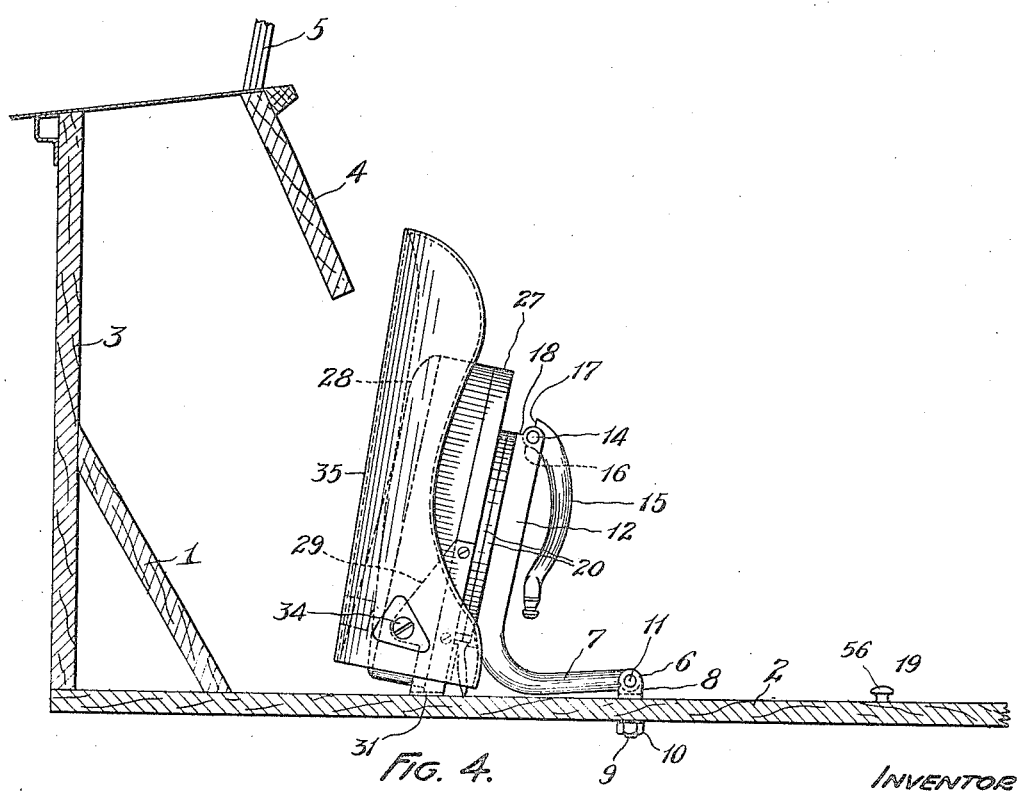
Fig. 4 is a view similar to Figs. 1, 2 and 3, but showing the seat completely folded.

29 indicates a pair of plates secured to the sides of the base 27, preferably by screws 30, and projecting upwardly therefrom. The plates 29 may be formed from a single piece of sheet metal, extending from one side of the base 27 around its rear edge to the other side thereof, thereby serving as a guard 31 to engage the floor 2 when the seat is folded into its inoperative position (Fig. 4). Near their upper edges, the plates 29 are formed with openings 32 (Fig. 9), in which are secured in any desired manner nipples 33, internally screw-threaded to removably receive the screw-threaded ends of trunnions 34.

Figure 3:
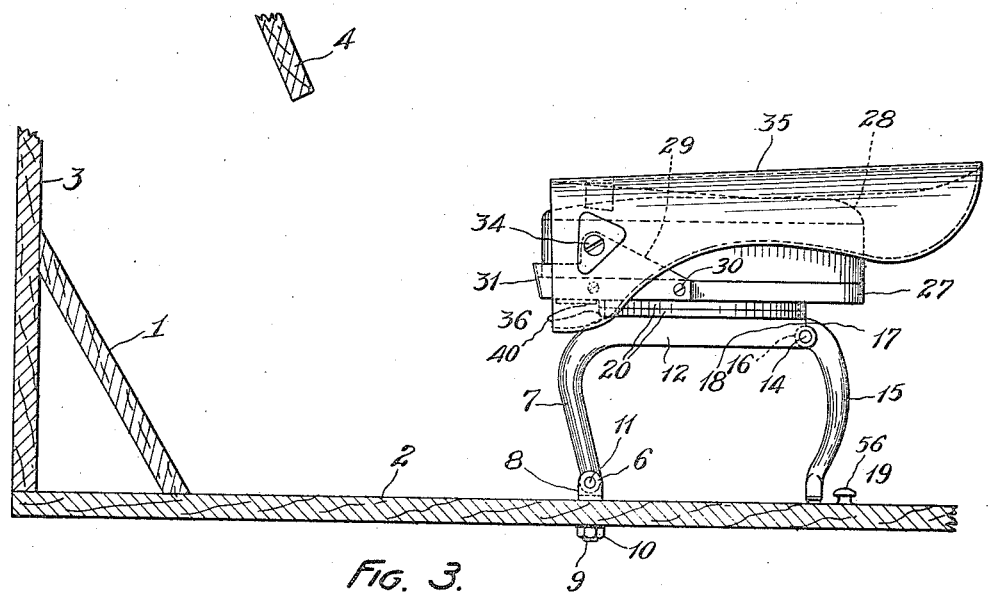
Fig. 3 is a view similar to Figs. 1 and 2, but showing the seat back folded.

35 indicates a back for the seat. The back 35 may be formed in any desired manner, but preferably comprises a curved member 35ª and an upholstered portion 35ᵇ, as shown in the drawings (Fig. 5). At its opposite sides, the back is provided with bearings, properly positioned to receive the trunnions 34 and thus permit the folding of the back 35 over or upon the cushioned base 27, as shown in Fig. 3. The back member 35ª extends downwardly below the trunnions 34 and near its lower end it carries a transverse plate 35ᶜ which engages the upper edge of the plate 31, the latter thereby serving to limit the swinging movement of the back away from the base 27 and co-acting with the trunnions 34 to rigidly support the back when in use.

36 indicates as an entirety means for maintaining or locking the seat 27 and back 35 in any desired position angularly of the shaft 23. The locking means 36 are preferably arranged to engage the turn-table disks 20. Of these means 37 indicates a slot or recess formed in the rim or edge of the upper disk 20.

38 indicates a plurality of slots or recesses formed in the rim or edge of the lower disk 20, each arranged at a predetermined position so that upon rotary movement of the upper disk, the slot 37 will be brought into registry with one of the slots 38 when the seat is at one of the desired positions for use.

39 indicates a key movably supported by one of the parts of the seat and arranged to enter the slots 37, 38 when in registry. The key 39 preferably comprises a lever, pivoted on the seat base 27 so that it may swing downwardly by gravity into locking position.

40 indicates a handle formed integrally with and extending outwardly from the lever 39. The handle also serves as a weight to operate the lever about its pivot into locking position.

41 indicates a spring which is preferably interposed between the lever 39 and the seat base 27 and normally tending to swing the lever 39 into locking position. The lever 39 is supported by a shaft 42 which is mounted at its opposite ends in suitable bearings. The bearings are formed in arms 43 which form part of a casting fixed in a recess 44 formed in the base 27. The casting is formed with a recess to receive and support one end of the spring 41.

In Fig. 6 the seat base 27 is shown locked in the position to permit a person to face forwardly. By raising the handle to disengage the key from the recess 38, the base may be turned or rotated until the slot 37 aligns or registers with the other slot 38, at which time the key may enter both slots and lock the seat base 27 in that position. To release the base and move it to another position, all that is necessary is to raise the handle 40 and hold it until the slots are out of registry. It may then be released as it will ride on the circumferential edge of the lower disk 20 until it reaches the other slot 38. I have shown in the drawings two slots 38, permitting the base to be locked in two positions, whereby the user may face forwardly or rearwardly. By providing additional slots 38, the base may be locked at any intermediate position.

Of the detachable connection 19, 45 indicates a base member formed with a socket 46 and spaced shoulders 47, the purpose of which will be later set forth.

48 indicates a head or ball carried by the free end of the separate leg 15 and fitting into the socket 46 when the leg is unfolded and the seat positioned for use. The base member 45 is so arranged that the head 48 will project into the socket by the movement of the seat from its inoperative to its operative position.

49 indicates a plate connected to the base member 45 at opposite sides of the shoulders 47 and cooperating therewith to form a guide-way for a slide 50. The plate 49 extends to either side of the plate 45 so that it may be connected to the floor 2 by suitable devices, such as screws 51. The plate 49 and slide 50 are formed with openings 52, 53 respectively to permit the head 48 to engage the socket 46, but in order that the head may be locked in the socket 46, the slide 50 is movable in the guide-way therefor so that one wall of the opening 53 in the slide may be moved over and engage the upper side of the head 48 and thus prevent its removal from the socket 46. At one end the slide 50 is provided with a flange 54. The flange 54 is engaged by a spring 55 which normally tends to maintain the slide in locking position. By moving the slide against the tension of the spring, by means of a handle 56, the head 48 may be released. From the foregoing description it will be seen that the slide serves as a spring catch and operates automatically to engage and lock the leg 15 when the seat is positioned for use.

My improved seat is so constructed that it may be arranged in various positions for use. By making the seat revoluble and the back foldable and pivoting the leg 15 to the seat member and the front leg 7 to the floor, the seat may be collapsed or folded into minimum space relatively close to one wall—for example, the dash of the vehicle, thereby providing a substantially unobstructed space within the vehicle as shown in Fig. 4. The elements are so arranged that the seat may be positioned for use simply by swinging it bodily on the pivots 11 to the upright position (Fig. 1), such operation in itself serving to arrange the leg 15 in supporting position and rigidly connecting the seat to the floor 2 to resist strains and thrusts in any direction resulting from the operation of the vehicle. It will be noted that when the leg 15 is connected to the floor 2 through the connection 19, the seat is supported against bodily movement relative to the floor irrespective of the angular position of the seat base and back.

To those skilled in the art to which my invention relates, many alterations in construction and widely differing embodiments and applications of the invention will suggest themselves, without departing from the spirit and scope thereof. My disclosure and the descriptions herein are purely illustrative and are not intended to be in any sense limiting.

What I claim is:

1. In mechanism of the class described, the combination with a vehicle having a floor, a front wall and a dash, of a seat having front and rear legs, a seat member and a back, means for pivoting the front legs to said floor, means for trunnioning the lower end of said back on said seat member to permit it to be positioned upon the latter, and means for revolubly supporting said seat member on said legs, whereby the back can be folded on said seat member and the seat member revolved and said seat swung forwardly below said dash and in close proximity to said front wall.

2. In mechanism of the class described, the combination with a vehicle having a floor, a front wall and a dash, of a seat having front and rear legs, a seat member and a back, means for pivoting the front legs to said floor, means for trunnioning the lower end of said back on said seat member to permit it to be positioned upon the latter, means for revolubly supporting said seat member on said legs, whereby the back can be folded on said seat member and the seat member revolved and said seat swung forwardly below said dash and in close proximity to said front wall, and a guard carried by the rear end of said seat member for engaging the floor when said seat is swung downwardly.

3. In mechanism of the class described, the combination with a vehicle having a floor, a front wall and a dash, of a seat having front and rear legs, a seat member and a back, means for pivoting the front legs to said floor, means for trunnioning the lower end of said back on said seat member to permit it to be positioned upon the latter, means for revolubly supporting said seat member on said legs, whereby the back can be folded on said seat member and the seat member revolved and said seat swung forwardly below said dash and in close proximity to said front wall, and a connection for detachably engaging the rear leg with said floor.

In testimony whereof I affix my signature, in the presence of two witnesses.

EDWARD H. REMDE.

Witnesses:
JOHN J. SHEEHY,
M. A. WATTERSON.